July 20, 1954     E. S. POMYKALA     2,684,231
GAS EJECTOR
Filed Feb. 25, 1952
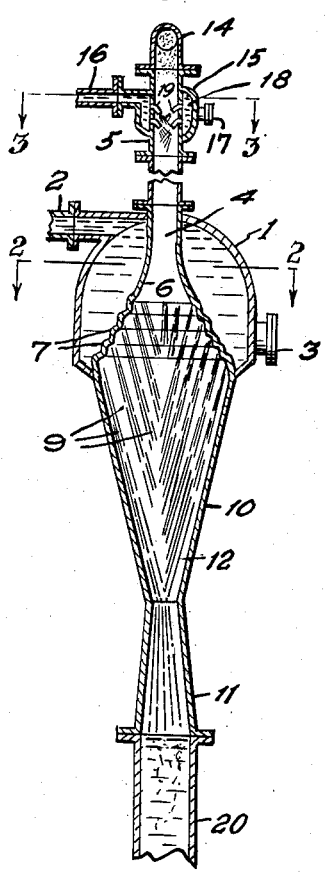
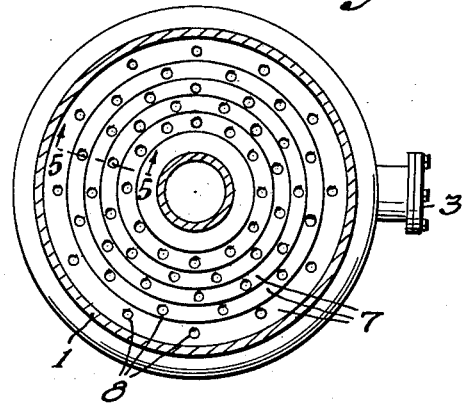
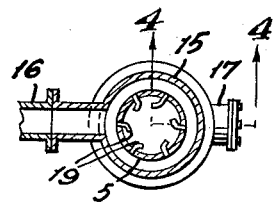
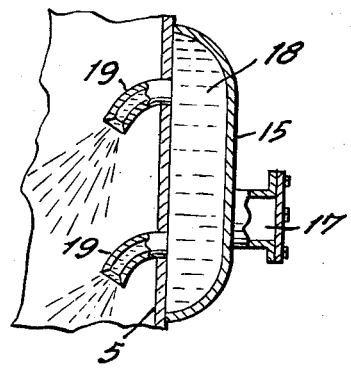
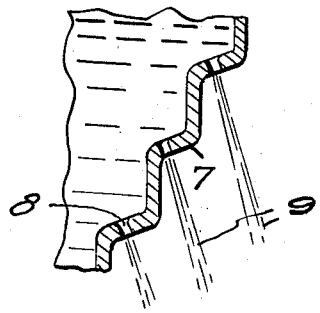
INVENTOR.
Edmund S. Pomykala
BY
Henry C. Parker
ATTORNEY.

Patented July 20, 1954

2,684,231

UNITED STATES PATENT OFFICE 2,684,231

GAS EJECTOR

Edmund S. Pomykala, Mobile, Ala.

Application February 25, 1952, Serial No. 273,309

11 Claims. (Cl. 261—21)

This invention relates to a gas ejector, and it comprises an ejector of the jet condenser type having at the top an annular liquid chamber usually having the shape of a dome, means for supplying liquid under pressure to said chamber, a vertical passageway for gases to be ejected passing centrally through said liquid chamber and separated therefrom by an annular wall which flares downwardly in steps thus forming an expanding passageway for the gases, the wall defining the gas passageway continuing downwardly below said annular liquid chamber in the shape of an inverted cone forming a conical mixing chamber, the stepped annular wall between said liquid chamber and said gas passageway being provided with a plurality of orifices at each of said steps serving to form a closely-packed inverted-cone shaped bundle of jets of liquid, the orifices being so constructed and arranged that the jets converge downwardly advantageously in lines substantially parallel with the conical wall of said mixing chamber, and a tail pipe connected to the discharge end of said mixing chamber; all as more fully hereinafter set forth and as claimed.

This application is a continuation-in-part of my copending application, Serial No. 148,492, filed March 8, 1950. In this prior application a method and apparatus for purifying flue gases were described and claimed. The apparatus there described included the jet condenser which is described and claimed herein.

While a large number of designs for barometric and multijet condensers have been proposed, most of these designs are rather complicated and expensive to manufacture and are not suitable for ejecting flue gases as described in my acknowledged copending application. In this process it is necessary to provide a low-cost, self-cleaning, multijet ejector-condenser of high aspirating efficiency and capacity and simple in design.

I have discovered that the necessary requirements can be met by providing a single annular fluid pressure chamber surrounding a central unobstructed passageway for the gases to be condensed, the wall separating the two being flared downwardly in steps, each of the steps being provided with orifices which are so constructed that the jets passing therethrough converge downwardly through a conical mixing chamber. The jets are advantageously projected in lines which are substantially parallel with the wall of the mixing chamber. The mixing chamber terminates in a tail pipe which may be provided with a constriction forming a venturi. If desired one or more steam jets may be provided at the inlet to the venturi to increase the exhausting effect. It is also possible to employ my multijet device as a barometric condenser in which case the conventional dry vacuum pump should be supplied.

In the particular use described in my acknowledged copending application my multijet device is employed to exhaust and to chemically treat flue gases. For this purpose the hot flue gases pass through a fine mist-like spray of water to cool them and charge them with water vapor before entering the ejector proper. The gases contain sufficient sensible heat to vaporize the sprayed water. The cooled gases saturated with water vapor then pass through the ejector, the jets of which are fed with a dilute solution of lime or sodium hydroxide to dissolve and insolubilize the $CO_2$ and $SO_2$. The remaining gases then pass out the tail pipe with the liquid in which the soluble gases are dissolved, while nitrogen and other insoluble gases are hydraulically compressed.

Owing to the fact that the gas passageway in my ejector is entirely unobstructed and that the gases pass straight through an enlarged mixing zone as they are being ejected, my ejector has an unexpectedly high capacity. A large number of jets can be provided so that mixing of the gases with the water or other liquid is very complete. Since the closely-packed bundle of jets move with a high velocity in the same direction as the gases, the undissolved gases are completely entrained in the liquid passing into the tail pipe, this entrainment being assisted if desired by the use of a venturi at the top of the tail pipe the inlet to which may be fed by a steam jet. This construction provides a high vacuum when the ejector is used as a jet condenser for example. My ejector is particularly useful in a number of other industrial applications requiring an exhauster of high capacity and inexpensive construction.

It will be noted that my ejector can be constructed of not more than three simple castings which can be welded together at minimum expense. This accounts for the low cost of my ejector. Its simple construction also enables a saving in critical materials.

My invention can be explained in greater detail by reference to the accompanying drawing which shows, more or less diagrammatically, a preferred embodiment of my invention. In this showing, Fig. 1 is a vertical section through my ejector, Fig. 2 is a horizontal section on an enlarged scale taken along the line 2—2 of Fig. 1, Fig. 3 is a horizontal section on an enlarged scale taken through the water vaporizer along the line 3—3 of Fig. 1, Fig. 4 is a partial vertical section through the water manifold of the vaporizer taken along the line 4—4 of Fig. 3, while Fig. 5 is a partial vertical section on an enlarged scale through the water chamber of the ejector taken along the line 5—5 of Fig. 2.

In the various figures like parts are designated by the same reference numerals. As shown in Fig. 1 my ejector comprises a dome-shaped annular water chamber 1 which may be supplied with water under pressure through the pipe 2. The pressure in this chamber may vary from about 8 to 60 pounds gauge or over depending upon the use to which the ejector is put. A manhole 3 is provided for cleaning purposes. A vertical unobstructed passageway 4 for gases or vapors passes through the center of the water chamber, this passageway being connected at the top to a pipe 5 supplying gases or vapors to be ejected. The gas passageway is separated from the water chamber by an annular wall 6 which flares downwardly in a series of steps 7, as shown best in Fig. 5. Each of the steps is provided with an annular row of orifices 8 through which the water from chamber 1 flows in the form of jets 9 (Fig. 5). A suitable arrangement of orifices is shown in Fig. 2. The jets converge downwardly as shown in Fig. 1 and entrap gases and vapors as they pass downwardly through the mixing chamber or condenser 10. The latter is in the shape of an inverted cone and the jets are advantageously directed substantially parallel to the conical wall. The mixing or condensing chamber may terminate at the bottom in a constricted Venturi-shaped tail pipe 11 which diverges below the constriction in order to convert the high velocity of the jets into pressure to overcome atmospheric pressure. It is also possible, of course, to employ my ejector as a barometric condenser in which case a tail pipe 20 must be used having an effective height of 34 feet or more. With this construction the nitrogen and other insoluble gases in the flue gases are hydraulically compressed when they pass out of the tail pipe.

In my acknowledged copending application I described my ejector in connection with the treatment of flue gases which were conducted to the ejector through pipe 14. This pipe is surrounded by an annular water chamber 15, fed by water under pressure from pipe 16 and provided with a handhole 17 for cleaning purposes. As shown best in Fig. 4 the water 18 in chamber 15 is sprayed through spray nozzles 19 into pipe 14 where it meets the hot flue gases and is thereby partly or wholly vaporized. The nozzles are directed at an angle to the vertical and therefore produce a whirling motion as the water sprays mix with the flue gases. The flue gases are cooled in the process and the mixture of flue gases and water vapor is then passed into the ejector through the pipe 5.

My ejector can, if desired, be supplied with a conventional vacuum breaker and/or a dry air pump, according to the use to which it is put. As to possible uses of my ejector, it can be employed in practically any place where barometric condensers, low level condensers and ejectors are indicated. It is particularly useful as the condenser unit of steam engines, steam turbines, etc. Owing to its high capacity it is useful wherever large volumes of vapors are to be condensed, such as in the recovery of solvents or other chemicals from air or the like. In this case it is possible to mix the vapors with a chemical solution passed through the ejector. For example, in the flue gas treating process described in my acknowledged copending application, a solution of sodium hydroxide or lime is passed through pipe 2 and mixed with a mixture of flue gases and water vapor in chamber 10.

While I have described what I consider to be the more advantageous embodiments of my ejector, it is evident, of course, that various modifications can be made in the specific structures which have been described without departing from the purview of this invention. Thus, the relative dimensions of the various parts of my ejector can be varied rather widely to adapt it to particular industrial applications. The tail pipe of my ejector can be connected to equipment adapted to recover solvents or other chemicals which may be mixed with or dissolved in the liquid discharged therefrom, one embodiment of such equipment being described in my acknowledged copending application. It is possible to operate my ejector with fluids other than water, for example with steam or with organic solvents, if it is desired to recover organic chemicals from air or the like. Other modifications of this invention which fall within the scope of the following claims will be immediately evident to those skilled in the art.

What I claim is:

1. An ejector comprising in combination an annular chamber for holding liquid, a conduit for feeding said chamber with liquid under pressure, a passageway for gases to be ejected passing through the center of said liquid chamber and being separated therefrom by an annular wall which is flared in steps as it passes downwardly through said chamber, each of the steps being provided with an annular row of orifices connecting the liquid chamber with the gas passageway to form a closely packed inverted-cone shaped bundle of converging jets of liquid to propel the gases through said passageway, the wall defining said passageway being in the shape of an inverted cone below the liquid chamber and defining a mixing chamber for liquid and gases, and a tail pipe connected to the discharge end of said mixing chamber.

2. The ejector of claim 1 wherein the orifices are so constructed that the liquid jets are substantially parallel with the wall of the conical mixing chamber.

3. The ejector of claim 1 wherein the tail pipe comprises a venturi.

4. The ejector of claim 1 wherein the gas passageway going into the ejector is surrounded with an annular chamber for water under pressure and connecting nozzles are provided to spray water into said passageway.

5. The ejector of claim 4 wherein said nozzles are directed at an angle to the flow of gases in order to produce a whirling motion of the water sprays.

6. An apparatus comprising a washing and vaporizing chamber for washing and cooling combustion gases and charging them with water vapor in combination with a water jet ejector for condensing and entrapping a mixture of combustion gases and water vapor, comprising in combination an annular chamber for holding condensing water, a conduit for feeding said chamber with water under pressure, an unobstructed passageway for gases and vapors to be ejected passing through the center of said water chamber, and being separated therefrom by an annular wall which is flared downwardly in steps as it passes through said chamber, each of the steps being provided with an annular row of orifices connecting the water chamber with the gas passageway to form a closely-packed inverted-cone shaped bundle of jets of water for propelling the gases and condensing the vapors as they pass through said passageway, the wall defining said passageway being inverted-cone-shaped beyond the liquid chamber and defining a conical mixing chamber for liquid and gases, and a tail pipe connected to the discharge end of said mixing chamber.

7. The ejector of claim 6, wherein the orifices are so constructed that the liquid jets are substantially parallel with the wall of the conical mixing chamber.

8. The ejector of claim 6, wherein the tail pipe comprises a venturi.

9. The ejector of claim 6, wherein the gas passageway going into the ejector is surrounded with an annular chamber for water under pressure and connecting nozzles are provided to spray water in a fine mist into said passageway.

10. The vaporizing and washing chamber of claim 9, wherein said nozzles are directed at an angle to the flow of gases in order to produce a whirling motion to the gases in the passageway.

11. An ejector comprising in combination an annular dome-shaped water chamber, a conduit for supplying water to said chamber under pressure, an unobstructed passageway for gases and vapors passing through said chamber and separated therefrom by a conical wall which is flared downwardly in steps, each of said steps being provided with a circular series of orifices connecting the water chamber with the gas passageway to form a closely-packed inverted-cone shaped converging bundle of jets of water propelling and entrapping the gases and condensing the vapors in said passageway, the wall defining said gas passageway being inverted cone shaped below said water chamber and forming a conical mixing chamber, the water jets being directed substantially parallel to the wall of said mixing chamber, and a tail pipe connected to the discharge end of said mixing chamber.

References Cited in the file of this patent

UNITED STATES PATENTS

| Number | Name | Date |
|---|---|---|
| 217,845 | Church | July 22, 1879 |
| 847,010 | Koerting | Mar. 12, 1907 |
| 899,882 | Matthews | Sept. 29, 1908 |
| 984,279 | Leblanc | Feb. 14, 1911 |
| 1,622,945 | Geare et al. | Mar. 29, 1927 |